United States Patent [19]

Greenbaum

[11] 4,178,715

[45] Dec. 18, 1979

[54] CHANNEL CULTURE ARRAY USING SALINE WATER

[76] Inventor: George Greenbaum, 790 Boylston St., Boston, Mass. 02199

[21] Appl. No.: 928,150

[22] Filed: Jul. 26, 1978

[51] Int. Cl.$^2$ .......................... A01G 9/02; A01G 1/00
[52] U.S. Cl. ......................................... 47/58; 47/1 R; 47/17; 47/27; 47/79; 47/86; 47/29
[58] Field of Search ..................... 47/1, 17, 27, 58–59, 47/79, 85–86, 29; 202/234

[56] References Cited

U.S. PATENT DOCUMENTS

| | | | |
|---|---|---|---|
| 2,807,912 | 10/1957 | Bjorksten | 47/58 |
| 2,813,063 | 11/1957 | Bjorksten | 47/1 X |
| 2,950,567 | 8/1960 | Newman | 47/17 |
| 3,653,150 | 4/1972 | Howard | 47/27 X |
| 3,987,585 | 10/1976 | Greenbaum | 47/85 |
| 4,014,135 | 3/1977 | Greenbaum | 47/86 |
| 4,107,876 | 8/1978 | Greenbaum | 47/79 |
| 4,125,963 | 11/1978 | Johnson | 47/27 |

FOREIGN PATENT DOCUMENTS 1443517 7/1976 United Kingdom ............. 47/27

*Primary Examiner*—Robert E. Bagwill
*Attorney, Agent, or Firm*—Richard L. Stevens

[57] ABSTRACT

A channel culture array having a plurality of V-shaped channels in side-by-side relationship. The array is placed on a base over which a contaminated water, such as seawater, flows. The underside of the array defines in part a zone. The pure moisture in the vapor phase condenses in the zone, coalesces on the underside of the array and permeates into the soil in the channels. The portion of the array contacted by the seawater is liquid impermeable.

18 Claims, 7 Drawing Figures

CHANNEL CULTURE ARRAY USING SALINE WATER

BACKGROUND OF THE INVENTION

Successful wide scale agriculture in arid lands which are adjacent to unlimited supplies of seawater have always presented a perplexing problem, namely the inability to use seawater for plant growth.

Where seawater is used it is typically desalinized such as by evaporation, osmosis or other separation techniques. This separation step adds considerably to the cost of the ultimate production of the crops.

A further drawbask is one that has been discussed in my prior patents and applications and overcome by the inventions disclosed therein. When plants are placed in the soil, water and nutrients are not fully utilized because of the permeability of the soil. Thus, if water sufficiently pure for crops is generated from seawater and used to irrigate crops in the ground most of the water is wasted.

The present invention overcomes the aforementioned problems by utilizing a modular channel concept in combination with polluted water such as saline solutions. Generally water and the air in equilibrium therewith at a first higher temperature are circulated under the floor of a channel culture array. The underside of the floor and the upper level of the water define a zone which zone is at a second lower temperature. The moisture in the air in equilibrium with the water condenses and coalesces on the underside of the floor of the modular channel array. The condensed water then permeates through the floor to the soil system supporting the plant. There is no liquid communication between the channel array and water whereby the contaminated water cannot contact the soil.

The maintenance of a reservoir of water adjacent a soil support system per se is well known. See Canadian Pat. No. 922,106, Ruthner, particularly FIG. 11. U.S. Pat. Nos. 2,486,512; 3,823,508; 3,877,172; and 3,895,494 all disclose various plant systems wherein water flows through a trough or similar device for irrigation of the soil support system.

U.S. Pat. No. 2,346,029 shows in FIG. 7 a plant support system spaced apart from a reservoir of water. However even in this patent wicks are used to transfer the water directly from the reservoir to the soil support system.

Thus in the prior art the water communicates directly with the soil and any contaminants in the soil would naturally impregnate the soil.

SUMMARY OF THE INVENTION

The present application relates to an apparatus and method for using water which would normally be considered contaminated for plant growth. More particularly, an apparatus and method are disclosed wherein saline water is used to maintain the soil in which a plant is growing in a wetted condition without the saline water contacting the soil.

My invention in one aspect comprises a channel culture array which has a fluid permeable floor, walls extending upwardly from the floor defining with the floor a cavity which contains soil, means to support the floor and maintain the floor spaced apart from the saline water and to prevent contact of the soil with the water.

The invention more particularly comprises a channel culture array having a floor with a plurality of fluid permeable substantially V-shaped channels is side-by-side relationship, a support member disposed between the opposed surfaces of the channels, the member and the opposed surfaces defining a cavity within which soil is placed. The means to space the cavities apart from the surface of the water are liquid impermeable and are shaped to allow the flow of saline water under the floor and to prevent any liquid contacting the soil disposed in the cavities.

The term "soil" broadly includes any soil support system which will support the plant it is desired be grown including nutrients or fertilizers, fill materials, etc.

The method of my invention relates to the use of the above described channel culture array and includes flowing relatively contaminated water at a first higher temperature into a zone which is at a second lower temperature, the water in the vapor phase in equilibrium with the water at the first higher temperature being noncontaminated; the zone defined by the undersurface of the floor of the array; condensing the water in the vapor phase in the zone at least a portion of the condensed water contacting the undersurface of the floor and permeating into the soil.

In the preferred embodiment where the channels are substantially V-shaped, the means to support the channels comprises the lower portions of the channels, the fold line of the V resting on a surface. These lower portions are apertured for the flow of water therethrough. The undersurface of the floor, or V-shaped channels, provides an increased surface area for the condensation, coalescing and permeation of the condensate into the soil. Other shaped channels may be used such as U-shaped, sinosoidal, etc., even a flat undersurface may be used.

In an alternative embodiment solar stills are placed between channels, such as in an alternating relationship, to enhance the wetting of the soil through condensation of the moisture in the vapor phase.

The basis for the use of the normally polluted water, such as seawater, for agricultural purposes is such that in tropical areas the typical ambient temperature during the day may range from ninety to one hundred twenty degrees Fahrenheit with a surface temperature of the water of from one hundred forty to one hundred sixty degrees Fahrenheit. As is well understood there always exists a relationship among temperature, both dry and wet bulb, dew point, moisture content per pound of dry air, etc. If a given volume of air is cooled, its ability to hold moisture is diminished and condensation of the moisture from the air results. These relationships can be determined from any psychrometric chart. Thus in my invention water and the air within which it is in equilibrium is caused to pass and circulate under the floor of the channel culture array. The undersurface of the floor is not exposed to the sun and therefore presents a relatively cooler surface and a relatively cooler zone, between the undersurface of the floor and the water, results. The moisture in the vapor phase condenses and at least a part of the condensed moisture coalesces on the undersurface of the floor, permeates therethrough and wets the soil.

The floor surface may be fluid permeable per se such as an open cell foam material, impermeable per se such as a polyethylene which is then apertured to make it fluid permeable or a combination of both.

Preferably a number of individual units with two or more channels are used within a particular reservoir or lagoon to increase the mass transfer of the moisture in the vapor phase from the vapor phase to the liquid phase. Also where the surface on which the floor rests is exposed to the sun such as about its perimmeter, said surface is colored, e.g., black to increase the temperature of the water.

The preferred embodiment will be described in reference to contaminated water, specifically seawater. As is well known the moisture in the vapor phase is pure in the sense that the salts and other deleterious impurities remain in the liquid phase. Thus when the moisture in the vapor phase condenses, either on the undersurface of the floor or from the solar still, it is pure and suitable for plant growth. In accordance with the principles of my invention other sources of contaminated or polluted water may be used where the impurities of the liquid phase are not found in the vapor phase in an amount sufficient to prevent plant growth.

DESCRIPTION OF THE PREFERRED EMBODIMENT

Figure 1:
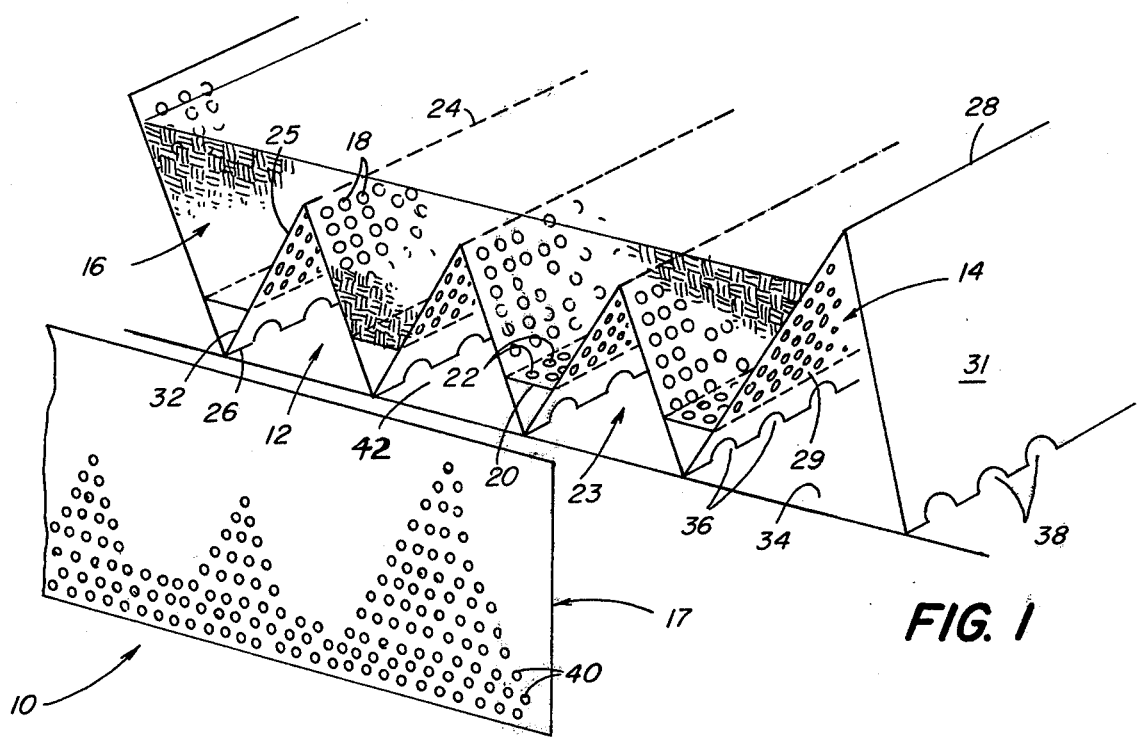
FIG. 1 is a perspective illustration of a channel culture array together with one end plate shown in telescopic view.

A preferred embodiment of the invention is illustrated in FIG. 1 and comprises a channel culture array 10 having a floor 12, outer walls 14 shaped as an inverted V, and including an upper fold line 28 and an inner side 29 and an outer side 31, and end plates 17 (only one end plate shown). The inner side 27 is common with the side of an adjacent channel 16.

The floor 12 comprises a plurality of V-shaped channels 16 which are apertured at 18. Support members 20 apertured at 22 are secured, such as by frictional engagement, between the opposed sides of each channel, and the opposed sides of the first and last channels and the inner sides of the outer walls respectively. The support members 20, the opposed walls of the channels, outer walls 14 and end plates 17 retain the soil within which plants are placed. The opposed sides of adjacent channels define tunnels 23, and the end plates 17 are apertured at 40 to register with the tunnels 23 of the channels 16.

The channels are formed in unitary construction in accordian fashion resulting in upper 24 and lower 26 fold lines. Upper portions 25 of the channel extend downwardly from the upper fold lines 24 to the support member 20.

The upper fold lines 28 of the outer walls 14 are higher than the fold lines 24 and define the upper limit of the soil.

Lower portions 32 of the channels extend from the support member 20 to the lower fold lines 26 and form legs which engage a base 34, such as a black polyethylene sheet. The array 10 may rest on sand, rock, etc. The support member 20 is secured to always be spaced apart from the upper level of the water which flows across the base 34. The lower portions or legs 32 are apertured at 36 to allow for the flow of water therethrough. The sides 29 and 31 of the outer wall are also apertured at 38. The end plate 17 includes the apertures 40 to allow for the flow of air and water. The material of construction used may be of any type, such as wood, concrete, plastic, etc. The lower portions 32 of the channels must not be liquid permeable. This is to prevent any contaminated water from contacting the soil.

Figure 2:
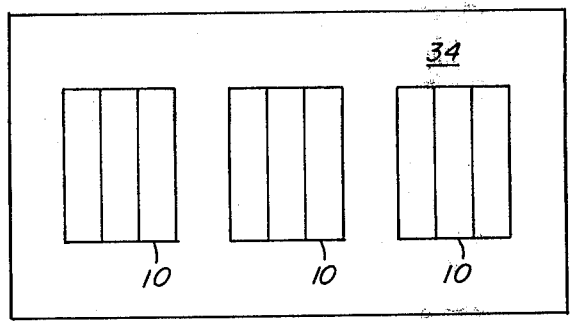
FIG. 2 is a plan view of a plurality of arrays as shown in FIG. 1.

As shown in FIG. 2 a plurality of arrays 10 are disposed upon a base 34. The base may be a lagoon, natural or man-made, tidal flat or artifical pool with a synthetic bottom such as a black polyethylene sheet.

The seawater is pumped or flows naturally across the base 34.

Assuming an ambient temperature of 120° F., humidity of 80%, the vapor phase in equilibrium with the water phase, will contain a fixed amount of moisture content per given volume of air. As the water flows under the floor 12 and into a zone 42 defined by the undersurface of the floor 12, essentially the undersurfaces of the upper portions 25 and support members 20 and the upper level of the water, it encounters a relatively cooler temperature, say 95° F., in the zone 42 in reference to the temperature of the ambient outside the zone. This cooler temperature results in the moisture in the vapor phase condensing, the condensation contacts the undersurfaces of the upper portions 25 of the channels 16, the undersurfaces of the support members 20 and coalesces thereon. The water then flows through the apertures 18 and wets the soil. The moisture also contacts the bottom surface of the support member 20 and passes through the apertures 22.

The climatic conditions, size of the arrays, amount of soil to be wetted, etc., will determine the number and specific dimensioning of the arrays. This obviously can be arrived at through energy and material balances.

Figure 3:
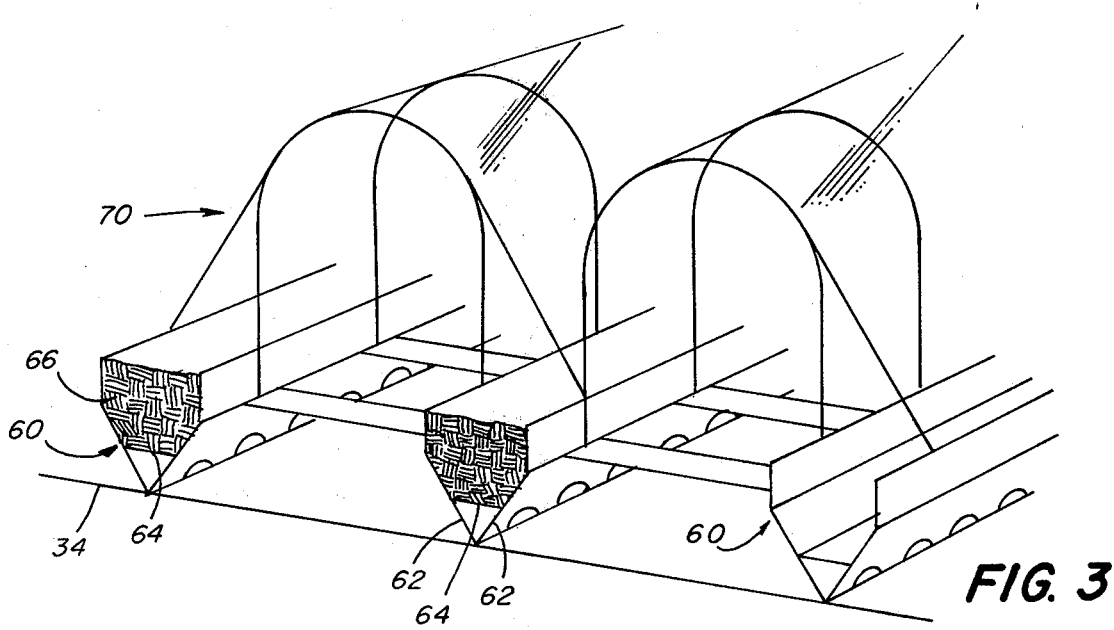
FIG. 3 is a perspective illustration of an alternative embodiment of the invention.
Figure 4:
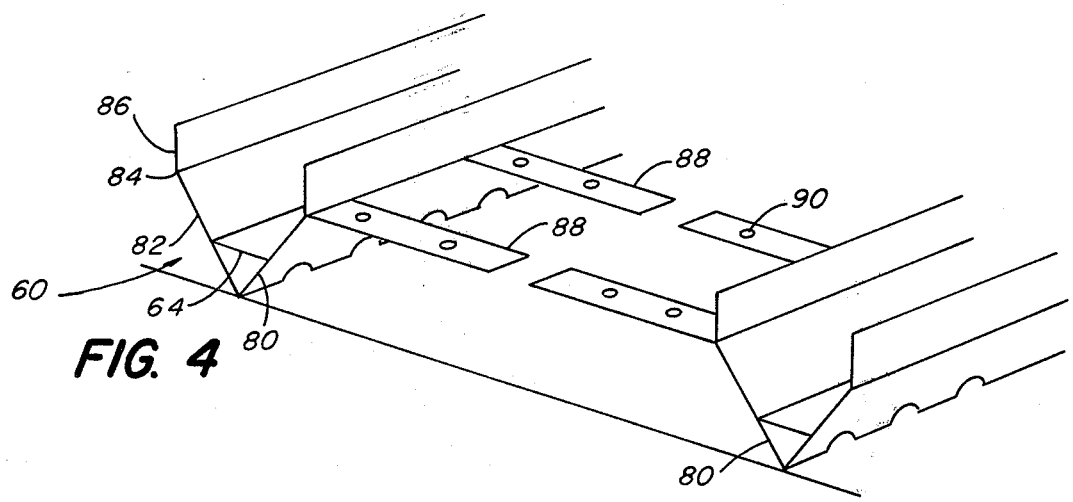
FIG. 4 is a perspective illustration of a portion of the embodiment shown in FIG. 3.

An alternative embodiment is shown in FIGS. 3 and 4. A channel 60 is formed substantially as in the preferred embodiment wherein two opposed sides 62 of channels form with a support member 64 and end plate (not shown) a cavity 66 in which soil is received. In this embodiment solar stills 70 are formed where the upper fold line of the embodiment of FIG. 1 appeared. In this alternative embodiment the spacing between channels is determined by the width of the solar stills 70.

Referring to FIG. 4, two channels 60 are shown disassembled and comprise lower portions 80 extending downwardly from the support member to the bottom fold line and an upper portion 82 extending from the support member upwardly where it turns at a bend 84 and terminates in a vertical wall 86. Extending from the bend 84 are a plurality of lateral support sections 88 having holes 90 therein.

Figure 5:
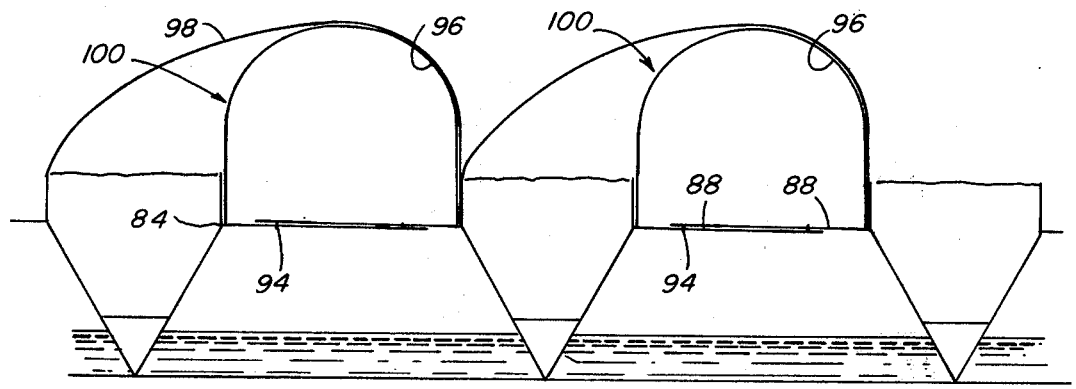
FIG. 5 is a front view of a section of FIG. 3.

As shown in FIG. 5 when assembled, pins 94 secure the channels together. The holes 90 determine the width of the solar still. That is if the outermost holes 90 of mating lateral support sections are pinned together then the space between channels will of course be greater than if the outermost hole of one lateral support member is pinned to the innermost hole of the mating support section.

U-shaped hoops 96 are received between opposed walls 84 of adjacent channels 60. They may be frictionally engaged or secured in any suitable manner. Draped on the hoops and extending across the soil is a clear film 98 such as polyethylene. Preferably the base on which the channels 60 rest is black such as a black polyethylene sheet. The solar energy heats the saline water resulting in evaporation and the moisture in the vapor phase condenses, at least a portion of the condensate falling into the soil.

The film 98 may be secured simply by being received between the wall 84 and the ends of the hoops 96 which are normally biased outwardly. The film 98 also encloses the front and rear of the channels and extends downwardly to about the plane in which the support member lies. This defines a chamber 100 and an environment within the chamber, in which the moisture in the vapor phase, will quickly reach the dew point or super-saturation and condense out, at least a portion of the condensate contacting the soil. The film as arranged also creates a greenhouse-like effect.

Although solar stills are shown alternating with channels any arrangement may be used: for example, two channels-one still-two channels; three channels-one still-three channels; three channels-one still-one channel; one still-two channels; etc. or any desirable combination with the films arranged appropriately to prevent evaporation to the atmosphere.

Figure 6:
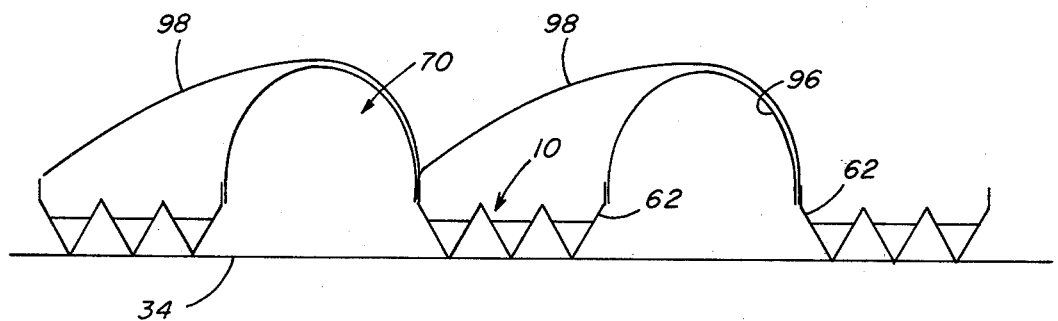
FIG. 6 is a front view of the embodiments of FIGS. 1 and 3 combined.

As shown in FIG. 6 an array 10 such as shown in FIG. 1 may be used in combination with the solar stills 70. In this embodiment the arrays 10 are preferably disposed on the black polyethylene sheet 34. The array of FIG. 1 is modified wherein the end wall 14 is deleted and a side 62, as shown in FIG. 2, is used for the solar still 70 and this sequence is continued. In this manner the moisture in the vapor phase condenses both on the undersurface of the floor of the array 10 and also on the clear film of the still 70 to maintain the soil in a wetted condition.

Figure 7:
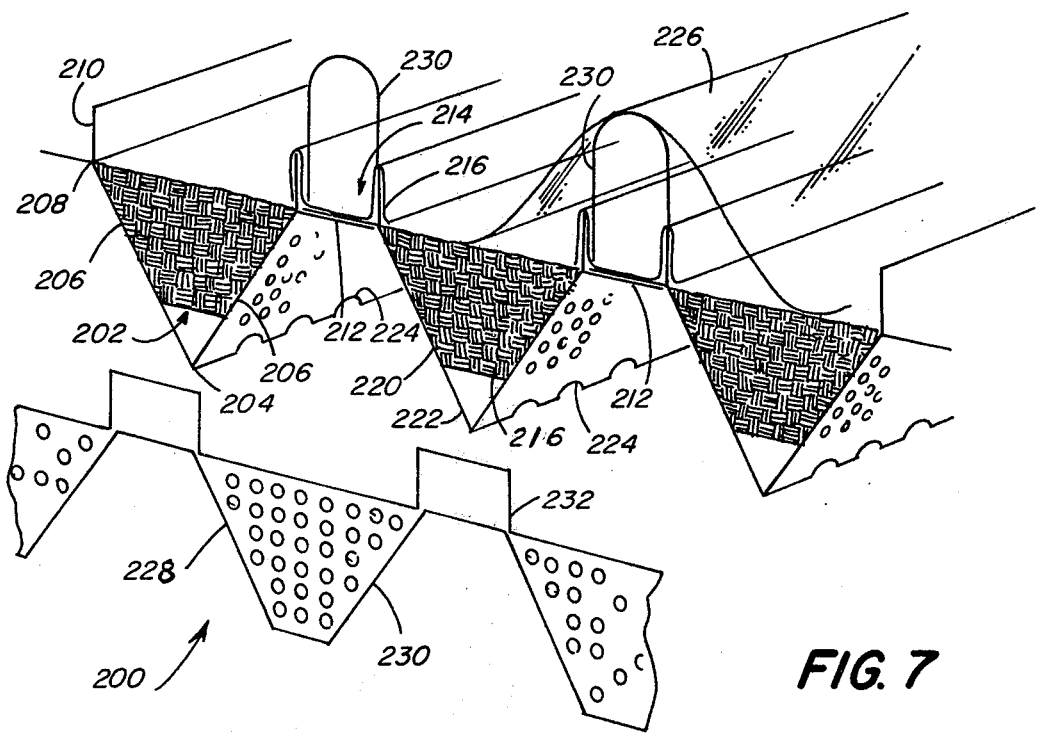
FIG. 7 is a perspective view of an alternative embodiment of FIG. 3.

FIG. 7 is a different embodiment of my invention employing a solar still. An array 200 comprises substantially V-shaped channels 202 having a lower fold line 204, opposed fluid permeable walls 206, the walls 206 having a bend 208 therein and vertically extending sections 210. Wing sections 212 extend laterally outward from the bends 208 of the walls 206 of adjacent channels to form troughs 214 which are lined with a fluid impermeable black polyethylene film 216.

The channels 202 include support members 216 received between opposed walls 206. As with the other embodiments described above, this support member 216 with the opposed walls receives the soil and creates within the channel 202 an upper portion 220 extending upwardly from the support member and a lower portion 222 extending downwardly from the support member. Again as with the other embodiments the lower portion is characterized by apertures 224 for the flow of seawater or saline water therethrough.

As with the other embodiments, it is preferred that the entire array be made from a liquid impermeable material such as high density polyethylene, polystyrene, etc. Where fluid flow is desired apertures are formed such as in members 216, upper portions 220, and the fold lines 204 at 224. In this way with the members 206 above the upper level of the water, no contaminated water can contact the soil such as by capillary action.

Hoops 230 are received within the troughs 214 and as with the embodiment illustrated in FIG. 3, support a clear film 226 which will allow solar energy or the sun's rays to pass therethrough. End plates 228 (only one shown) close the ends of the array 200. More particularly the end plates 228 comprise truncated saw-toothed sections 230 joined to toothed sections 232. The sections 232 are liquid impermeable and close the ends of the troughs 214 in order to retain the seawater which is pumped in. The sections 230 are apertured and fluid permeable; however they may be fluid or liquid impermeable if desired. The plates may be sealingly secured in any suitable manner in order to be integrally joined to the channels and form part of the array 200.

Other geometric configurations will occur to those skilled in the art for the shape of the channels, the combination of arrays, the number of channels in a particular array, the means to space the floor of the arrays or channels apart from the saline or contaminated water, materials of construction, etc.

It should be understood that the foregoing description if for the purpose of illustration and that the invention includes all equivalents and modifications within the scope of the appended claims.

What is claimed is:

1. A channel culture array which is received on a base over which contaminated water flows comprising:
   a fluid permeable floor,
   walls extending upwardly from the floor and defining with the floor a cavity to contain soil,
   means joined to the floor
      to support the floor and engage the base,
      to maintain the floor spaced apart from the contaminated liquid, and
      to prevent contact of the soil with the liquid,
   the undersurface of the floor, said means and the surface of the water defining a zone which is at a temperature lower than the ambient temperature outside of the zone whereby the moisture in the vapor phase in the zone condenses, coalesces on the underside of the floor and wets the soil.

2. The array of claim 1 wherein the floor comprises a plurality of elongated channels arranged in side-by-side relationship.

3. The array of claim 2 wherein the floor and the means joined to the floor comprise channels which channels are substantially V-shaped.

4. The array of claim 2 wherein the floor and the means joined to the floor comprise a plurality of substantially V-shaped channels aligned in side-by-side relationship, each channel having a lower fold line said fold line adapted to engage the base, the channels further comprising upper and lower portions, the lower portions characterized by a plurality of apertures for flow of liquid therethrough, the upper portions characterized by apertures for the flow of fluid therethrough.

5. The array of claim 4 wherein the walls include two outer walls comprising an inverted V-shaped channel in parallel with the V-shaped channels having an inner side and an outer side, the inner side common with the wall of an adjacent V-shaped channel, and having upper fold lines, said fold lines lying in a plane above the upper fold lines of the channels, and the walls further comprising end plates, the end plates being apertured to allow fluid flow across the undersurface of the channels.

6. The array of claim 5 which includes support members received within each V-shaped channel said support member secured between the opposed walls of each channel and supporting the soil with the upper portions of the channels, the outer walls and the end plates.

7. The array of claim 5 which includes a plurality of arrays disposed on the base.

8. The array of claim 1 or 7 wherein the surface of the base is black.

9. The array of claims 1, 3, 4, 5 or 6 which comprises:
at least two arrays arranged in spaced apart relationship;
means to define an opening between the arrays the opening dimensioned such that the water on the base will be in communication with the solar energy;
means to enclose the opening and at least one of the adjacent arrays to form a chamber such that a greenhouse-like effect is created and an environment created within the chamber such that as the water on the base is heated and the moisture in the vapor phase reaches and goes beyond the dew point, water will condense, at least a portion of which will contact the soil.

10. The array of claim 9 which includes means to secure fixedly the spaced apart arrays and the means to enclose the opening includes a film whereby the solar energy can pass through and contact the water on the base.

11. The array of claim 10 which includes a plurality of arrays in spaced apart relationship defining a plurality of openings.

12. The array of claim 10 wherein the means to enclose the openings includes a plurality of hoop-like structures to support the film.

13. The array of claim 10 wherein the means to secure fixedly the spaced apart arrays includes a fluid impermeable trough disposed in said opening and means to retain contaminated water within the trough, the condensate formed by the solar energy generated from the contaminated water in the trough.

14. A method of growing plants wherein the soil which sustains the plants is disposed in a channel culture array which array has a fluid permeable floor and walls defining a cavity within which soil is received and the floor is spaced apart from a source of contaminated water and defines with the contaminated water a zone which method includes:
flowing the contaminated water from outside the zone to within the zone, the water phase and vapor phase of the water outside the zone being at a first higher temperature, the moisture in the vapor phase being pure in reference to the contaminated water and being suitable for enhancing the growth of plants disposed within the soil, the temperature in the zone at a second lower temperature;
condensing the moisture in the vapor phase in the zone at least a part of the condensed moisture contacting the undersurface of the floor and permeating through the floor to wet the soil.

15. The method of claim 14 wherein the contaminated water is saline water.

16. The method of claim 14 wherein the array comprises a plurality of substantially V-shaped channels the channels having lower fold lines which engage the base, the channels further having a support member secured between the opposed walls of the channels the members above the upper level of the contaminated water the channels having upper portions and lower portions the lower portions having apertures for the flow of the contaminated water therethrough and which comprises
flowing the water through the apertures the moisture in the vapor phase condensing and contacting the undersurface of the floor which comprises both the undersurfaces of the support members and upper portions of the V-shaped channels.

17. The method of claims 14, 15 or 16 wherein the array comprises at least two arrays in spaced apart relationship defining an opening therebetween such that the water on the base will be in communication with solar energy and wherein the opening is enclosed to form a chamber and which includes:
exposing the water from the base to solar energy the temperature of the water rising the moisture in the vapor phase exceeding its dew point and forming a condensate; and
contacting the soil with at least a portion of the condensed moisture.

18. The method of claim 14 which includes creating a separate source of contaminated water distinct from the contaminated water flowing across the base which is exposed to the solar energy and which is the sole source for the condensate created directly by the solar energy.

* * * * *